Sept. 8, 1931. R. L. PARK Re. 18,183

BEAN HARVESTER

Original Filed Nov. 7, 1925 5 Sheets-Sheet 1

Inventor
R. L. Park
By C. A. Snow & Co.
Attorneys.

Sept. 8, 1931. R. L. PARK Re. 18,183

BEAN HARVESTER

Original Filed Nov. 7, 1925 5 Sheets-Sheet 2

Inventor

R. L. Park

By C. A. Snow & Co

Attorneys.

Sept. 8, 1931. R. L. PARK Re. 18,183

BEAN HARVESTER

Original Filed Nov. 7, 1925 5 Sheets-Sheet 3

Inventor
R. L. Park
By C. A. Snow & Co.
Attorneys.

Sept. 8, 1931. R. L. PARK Re. 18,183

BEAN HARVESTER

Original Filed Nov. 7, 1925 5 Sheets-Sheet 4

Inventor
R. L. Park
By Cachow & Co.
Attorneys.

Sept. 8, 1931. R. L. PARK Re. 18,183

BEAN HARVESTER

Original Filed Nov. 7, 1925 5 Sheets-Sheet 5

Inventor

R. L. Park

By C. A. Snow & Co.

Attorneys.

Reissued Sept. 8, 1931

Re. 18,183

UNITED STATES PATENT OFFICE

ROBERT LEE PARK, OF DARDEN, TENNESSEE

BEAN HARVESTER

Original No. 1,776,129, dated September 16, 1930, Serial No. 67,640, filed November 7, 1925. Application for reissue filed January 30, 1931. Serial No. 512,326.

This invention relates to harvesting machines, particularly to those designed for use in harvesting beans, and has for its object the provision of a novel device of this character particularly well adapted for use in harvesting soy beans or the like planted in corn fields and also capable of harvesting beans planted in rows and in fields where there is no growing corn, the device being capable, in the latter instance, of harvesting two rows simultaneously.

An important object of the invention is to provide a machine of this character which will not only act to harvest the beans, but which will also thrash them and winnow them so that when they are discharged from the machine they will be in a thoroughly clean condition ready for commercial use.

Another object of the invention is to provide a machine of this character which is provided with steering means and movably mounted wing means cooperating therewith whereby the operator walking along behind the machine, which may be drawn by any suitable means such as draft animals, may, by manipulating proper handles or levers, guide the device in such manner as to harvest and kick out the bean plants from between hills of corn without injury to the latter.

Still another object is to provide a device of this character provided with novel means for raising and lowering the harvesting mechanism with respect to the ground traveled over, this adjustment being for purposes which may be necessary as circumstances will dictate.

An additional object is to provide a device of this character in which the power mechanism for operating the thrashing device and winnowing means will be operated by movement of the ground engaging wheels over the surface, it being consequently unnecessary to provide any engine or other auxiliary device for effecting driving of any of the parts.

A still further object is to provide means whereby the upper portions of the bean plants are bent laterally so as to extend substantially horizontally within the machine during the thrashing operation, thereby making it unnecessary to utilize bottom openings for the reception of the plants through which thrashed beans might escape.

An additional object is to provide a device of this character which will be comparatively simple and inexpensive in manufacture, easy to operate and control, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1:
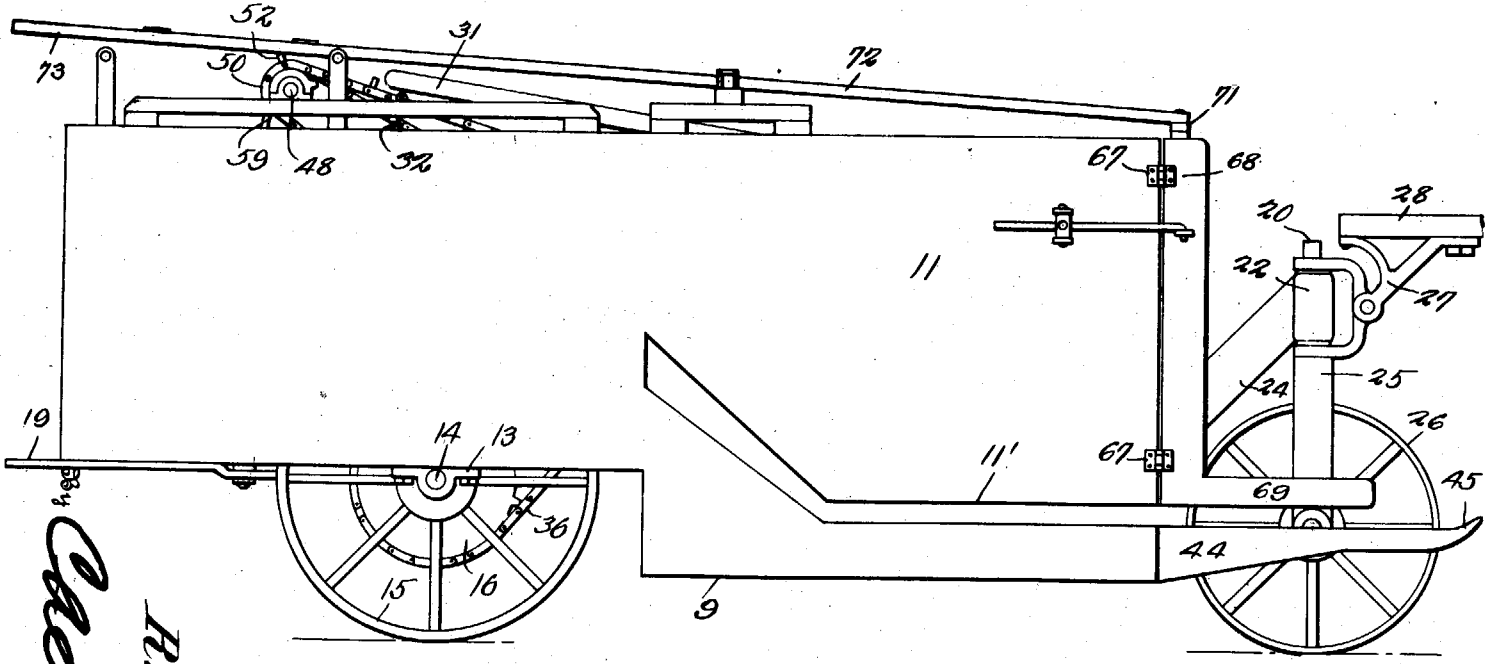
Figure 1 is a side elevation of the complete machine.

Referring more particularly to the drawings, I have shown the device as comprising a suitable relatively stationary supporting frame designated broadly by the numeral 10, which frame may consist of any desired or necessary number of bars or other supporting elements arranged in any preferred relation and secured together by any desired means.

Frame 10 carries a housing 11 the front of which is formed with a horizontal inlet opening 11′ which extends to the outer side of the housing and thence rearwardly along said outer side in a substantially horizontal direction, the back portion of the inlet opening merge into an upwardly inclined enlarged extension of the opening shown at 42. The bottom of the housing is preferably made in the form of a trough as shown at 46, this trough extending rearwardly and having its rear portion inclined rearwardly and upwardly as shown at 46′. It is to be understood that frame 10 can carry two housings 11 such as heretofore described, one of them being located at each side of the machine.

Located within the frame is a body 9 including a frame 12 with vertically extending longitudinally arranged partition members 12ª, suitably mounted. At the rear portion of the frame 10 are bearings 13 through which is journaled the rear axle 14 carrying ground engaging wheels 15 and a sprocket 16 loose thereon and adapted to be keyed thereto for rotation therewith by means of a clutch device including a shiftable member 17 engaged by a shifting fork 18 at one end of a pivoted lever 19 which projects beyond the rear end of the machine.

Mounted at the forward end of the frame 10 is a suitably mounted vertical shaft or spindle 20 here represented as rigid with the arms of a yoke 21. Loosely mounted in this shaft or spindle is a sleeve 22 forming part of a bracket 23 on the forward end of a stub tongue or bar 24. The shaft or spindle terminates in a yoke 25 within which is mounted the front wheel 26. Connected with the yoke 21 is a suitable draft device which is here represented as including a support 27 connected with a tongue, draw bar or the like generally indicated at 28. The wheel 26 of course supports the forward end of the machine and this wheel is capable of being turned so as to draw the device along in the direction desired. Obviously, if the tongue or draw bar 28 be moved to one side or the other, the yoke 25 carrying the front wheel will be correspondingly moved.

It is of course desirable that the body 9 containing the mechanism to be described, be vertically adjustable with respect to the surface traveled over, and for this reason I have pivoted the bar 24 to the rear end of the body as shown at 24ª. Secured to the bar is an upstanding member 29 upon which is pivoted at 30, a lever 31 extending to the rear upper portion of the machine, the rear end carrying a chain 32, a selected link of which may be engaged upon a supporting hook 33 whereby any desired adjusted position of the body may be effected. Obviously, this will provide means for adjusting the height of the body of the machine itself with respect to the surface traveled over. This is true because lever 31 is pivoted to the body at 31ª, and the forward truck supports the body from point 30 and point 31ª.

Journaled transversely of the machine at substantially the central portion thereof is a shaft 34 carrying a sprocket 35 about which is trained a chain 36′ peripherally engaging the sprocket 16 on the rear axle of the machine. Journaled transversely of the frame of the machine in advance of the shaft 34 and at a lower level are other shafts 37 carrying sprockets 36 about which is trained a chain 38 which peripherally engages a sprocket 39 on the shaft 34. Obviously, when the clutch mechanism is thrown in to lock the sprocket 16 onto the rear axle 14 the shaft 34 will be driven and this will operate to drive the shafts 37. Secured upon each shaft 37 is a pair of supporting members 40 provided at their edges with short lengths of chain 41 which will act as flails in the manner to be described.

Figure 3:
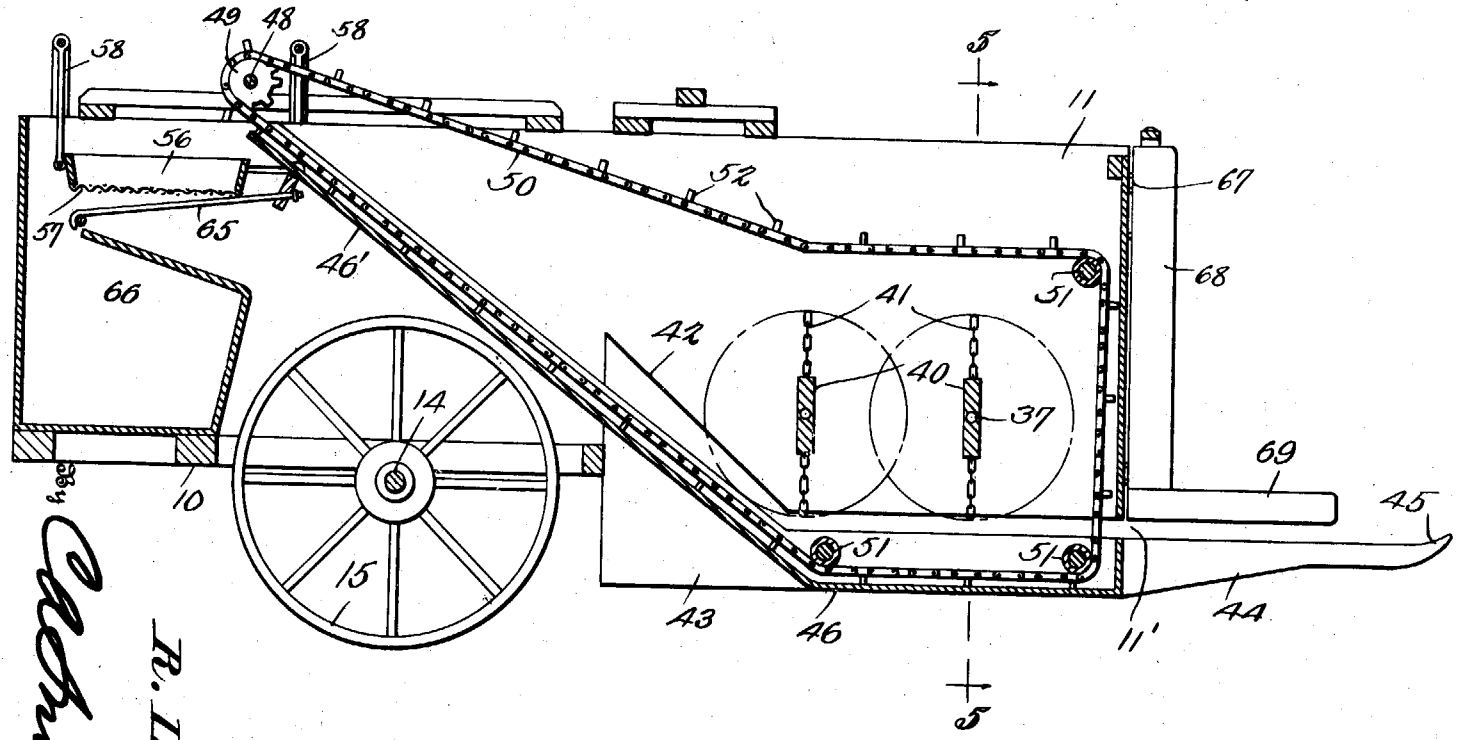
Figure 3 is a vertical longitudinal section taken on line 3—3, Fig. 4.
Figure 4:
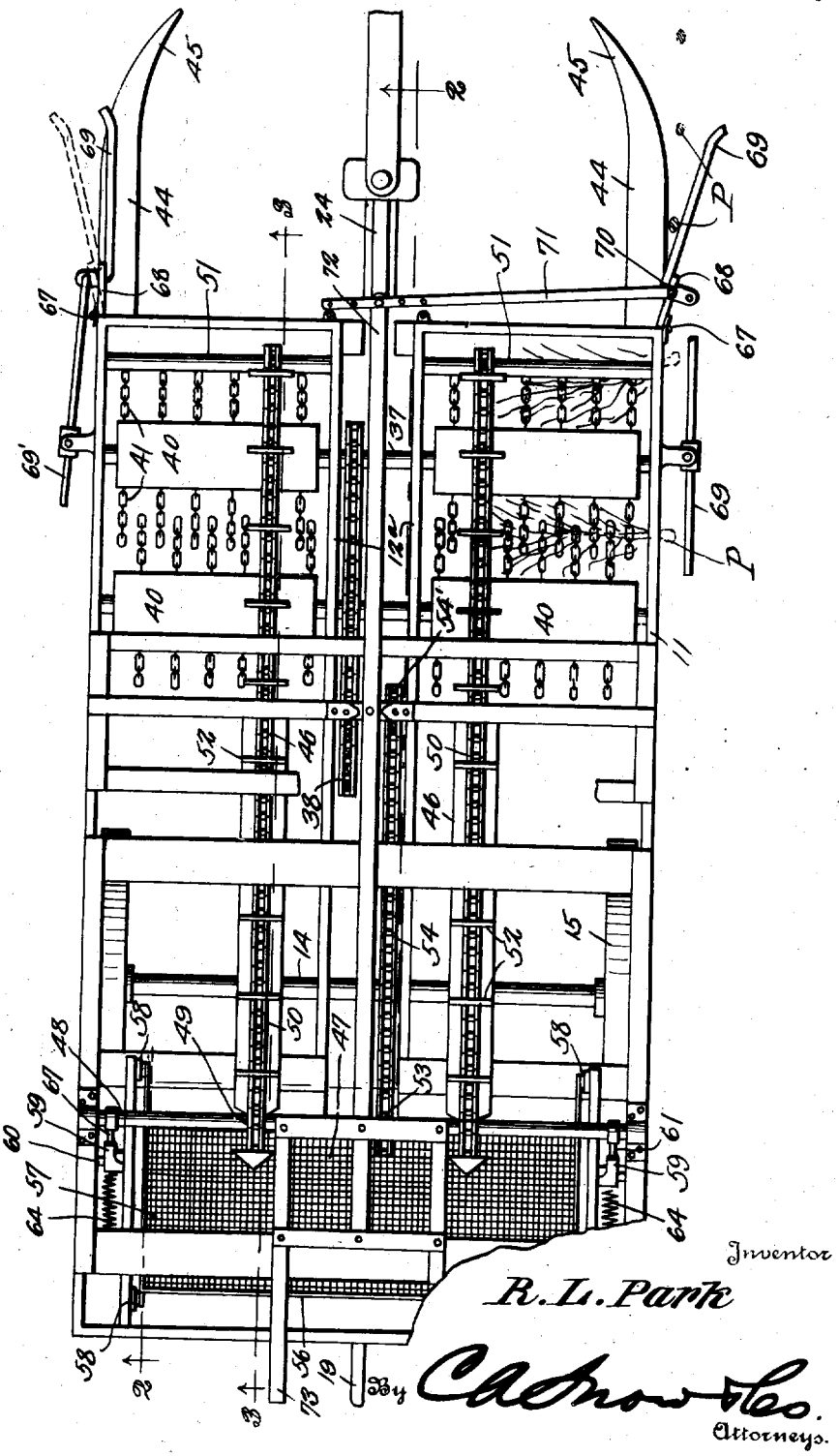
Figure 4 is a plan view.

The upper rear ends of the inclined portions 46′ of the troughs 46 are adapted to deliver material to the winnowing mechanism designated generally by the numeral 47 located at the rear portion of the machine. Gathering arms 44 are extended forwardly from the outer sides of the respective housings 11 and each of them has its forward end curved upwardly and laterally as indicated at 45 in Figures 3 and 4.

Figure 2:
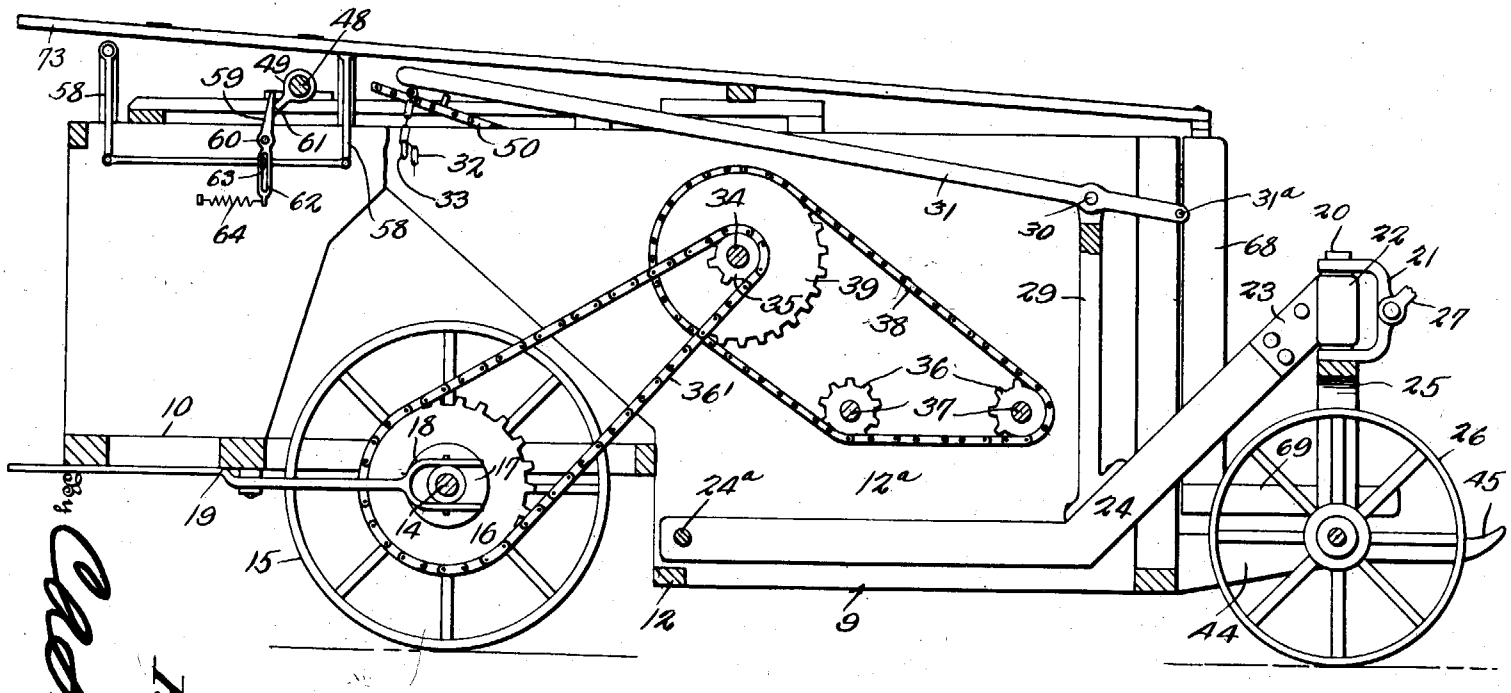
Figure 2 is a vertical longitudinal section therethrough, taken on line 2—2, Fig. 4.

Journaled transversely at the top of the frame and near the rear end thereof is a shaft 48 on which are mounted sprockets 49 peripherally engaged by chains 50 which are trained about guides 51 located at various spaced points at the forward portion of the machine, the lower stretch of the chain passing along over the bottom of the associated or adjacent end member and upwardly along the bottom of the associated trough 46. It will be observed that there are two of the chains 50 and that each one carries a plurality of lugs or other equivalent members 52 which will operate to drag the bean vines or branches or portions thereof upwardly and rearwardly along the trough for discharging them into the shaking and winnowing mechanism to be described in detail. The shaft 48 carries an additional sprocket 53 (Fig. 4) about which is engaged a chain 54 engaging a sprocket 54′ to be carried by the shaft 34 of Figure 2 whereby the conveyor mechanism defined by the trough and chains 50 will be operated when the machine is drawn along the ground.

Mounted at the rear portion of the machine is a shaker 56 which has a screen bottom 57. This shaker is mounted on hangers 58 suitably connected to the frame, and movement of the shaker is effected by means of a lever 59 pivoted at 60 and having one end disposed in the path of movement of an arm 61 on the shaft 48. At its other end, the lever is provided with an elongated slot 62 engaging a pin 63 or the like projecting from the shaker. Coil springs 64 are provided which normally act to hold the shaker at one limit of its movement and to return it to normal positions after actuation by engagement of the arm 61 with the lever 59.

Suitably mounted beneath the shaker 56 is a grid member 65 which is formed of a plurality of rods spaced apart a sufficient distance to prevent beans from passing between them while permitting trash and other matter such as fragments of pods and vines to pass through and be discharged. The trash can be removed manually, the beans passing onto grid 65 and passing thence to hopper 66. The hopper may of course be constructed in such manner as to have discharge means for permitting the removal of beans accumulating therein.

Hingedly mounted at the forward ends of the sides 11, as shown at 67, are outwardly swingable upright boards or side members 68 carrying wings 69. Side members 68 are adjustable by rods 69′. However, one element 69′ may be idle so that adjacent side elements 68, 69 may be adjusted by handles 73, or swung to the best position for deflecting the vines toward the machine. Pivotally connected with the side members 68, as shown at 70, is a link 71 which extends toward the center of the machine and which is connected at its inner end with a longitudinally extending bar 72 provided at its rear end with handles 73. Intermediate its ends bar 72 if pivoted to the link 71 so that by grasping the handles 73 and shifting the bar 72 to one side or the other, the link 71 will be operated to swing the board member 68 and guide wing 69 inwardly or outwardly as the case may be.

Figure 5:
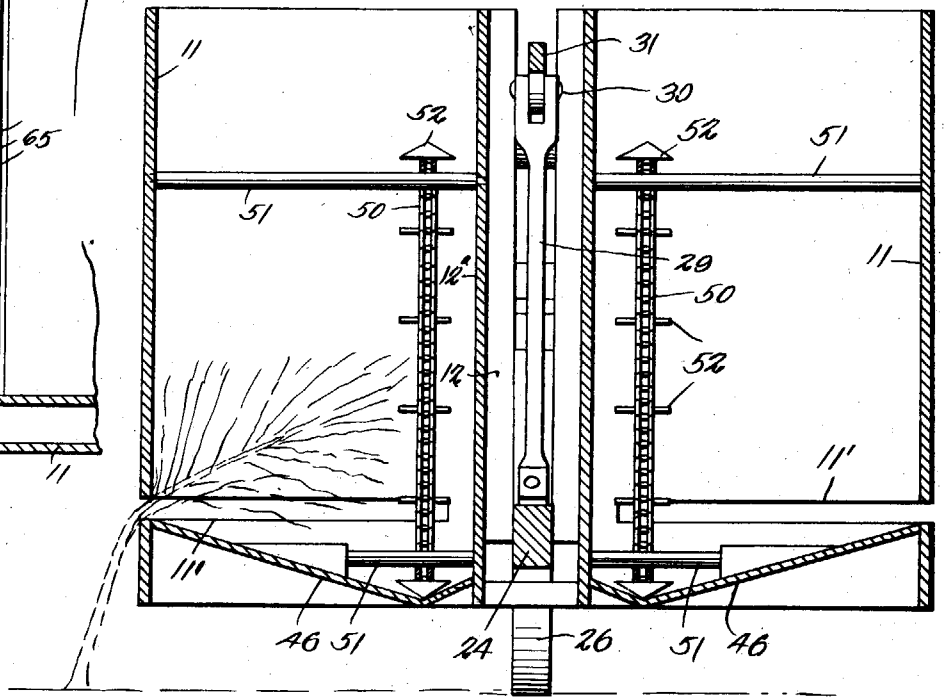
Figure 5 is a vertical cross section taken on the line 5—5, Fig. 3.
Figure 6:
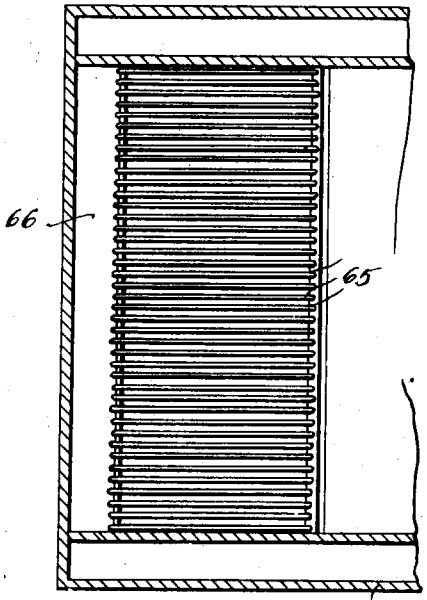
Figure 6 is a fragmentary plan view showing the winnowing mechanism.

In the operation of the machine the forward end 45 of each arm 44 is adapted to extend along the inner side of a row of bean plants so that said plants will be received in upstanding positions between arm 44 and wing 69. In order that the upper portions of the bean plants may be caused properly to enter the housing 11 the operator swings the wing 69 intermittently so as to bend the plants over the adjacent arm 44 and allow the upper portions thereof to enter the front portion of the opening 11′. Thereafter, as the machine moves forwardly, the upper portions of these plants will remain in substantially horizontal positions within the housing and within the side portion of opening 11′ as will be apparent by referring to Fig. 5 wherein the plant has been indicated at P. Thus the upper portions of the plants, while held in substantially horizontal positions will be beaten by the chains 41 rotating with the member 40 and the pods will be broken open. The beans liberated therefrom will gravitate onto the hopper like bottom 46 and then be carried rearwardly and upwardly by the lugs 52 on chain 50. These lugs will scrape the beans onto the shaker 56 which is moved rapidly back and forth by the action of member 61 on shaft 48, this member engaging against lever 59 which, in turn, is pivotally and slidably connected with the shaker. After the plants have been beaten or thrashed as described, the upper portions thereof will withdraw through the rearwardly and upwardly inclined enlarged portion 42 of opening 11′.

When the device is used for harvesting and thrashing two adjacent rows of beans it is obvious that the board members 68 and wings 69 should be fastened open to the side of the harvester, the link 71 being disengaged from the member 68, the elements 71, 72 and 73 being removed. When it is intended to harvest beans such as soy beans, which are commonly planted between the hills of corn in a corn field, the device is driven along between successive rows of corn and from time to time the operator manipulates the handle 73 to move the bar 72 assumed to be pivoted at its forward end, and lateral movement of the handle 73 results in opening or closing member 69, for moving into the path of the machine, the bean vines growing between hills of corn.

From the foregoing description and a study of the drawings, it will be apparent that I have thus provided a comparatively simple and consequently relatively inexpensive machine by means of which beans of various kinds may be harvested regardless of whether they are growing in rows in a field or whether they are growing between corn plants in hills in a corn field, means being provided whereby beans growing between hills of corn may be quickly and easily gathered in without injury to the corn plants. It will be observed that ample provision has been made for all adjustment necessary for the proper action and it is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

I claim:—

1. In a machine of the class described, a wheel supported frame, vertically positioned extension members hinged upon the sides of the frame, at the forward portions thereof, outwardly extending wings carried by the lower portions of the extension members, a link pivoted to one of these members and extending inwardly to the center line of the machine, a lever operable from the rear portion of the machine and extending forwardly to a point between the wings, and a device for connecting the lever with points on the link spaced from the inner end thereof.

2. In a bean harvester the combination with a portable housing having front and side inlet openings, of thrashing means within the housing, and means for deflecting bean plants laterally into the front and side openings for engagement by the thrashing means.

3. In a bean harvester the combination with a portable housing having a substantially horizontal opening extending laterally from one side in the front of the housing and rearwardly within said side, of means extending forwardly from the housing for movement along one side of a row of bean plants, and means extending forwardly and movable laterally relative to the housing for bending the upper portions of the plants in the row over the first named means to bring their upper portions into substantially horizontal positions for entry into the front and side openings.

4. In a bean harvester the combination with a portable housing having a substantially horizontal opening extending laterally from one side in the front of the housing and rearwardly within said side, of means extending forwardly from the housing for movement along one side of a row of bean plants, means extending forwardly and movable laterally relative to the housing for bending the upper portions of the plants in the row over the first named means to bring their upper portions into substantially horizontal positions for entry into the front and side openings, and means within the housing for thrashing the top portions of the plants while extending substantially horizontally within the housing.

5. In a bean harvester the combination with a portable housing having a substantially horizontal opening extending laterally from one side in the front of the housing and rearwardly within said side, of means extending forwardly from the housing for movement along one side of a row of bean plants, means extending forwardly and movable laterally relative to the housing for bending the upper portions of the plants in the row over the first named means to bring their upper portions into substantially horizontal positions for entry into the front and side openings, and means within the housing for thrashing the top portions of the plants while extended substantially horizontally within the housing, the back portion of the side opening being enlarged and inclined upwardy and rearwardly to permit free withdrawal of the top portions of the plants after leaving the thrashing means.

6. In a bean harvester the combination with a portable housing having a substantially horizontal opening extending laterally in the front thereof from one side and rearwardly within said side, and thrashing mechanism in the housing, of a gathering member extending forwardly from the side of the housing in line with the bottom of the opening, and forwardly extending means for bending plants of a row laterally over the gathering means to position the upper portions thereof substantially horizontally for entry into the housing through the front and side openings.

7. In a bean harvester the combination with a portable housing having a substantially horizontal opening extending laterally in the front thereof from one side and rearwardly within said side, and thrashing mechanism in the housing, of a gathering member extending forwardly from the side of the housing in line with the bottom of the opening, forwardly extending means for bending plants of a row laterally over the gathering means to position the upper portions thereof substantially horizontally for entry into the housing through the front and side openings, and means under the control of the operator for actuating the bending means laterally.

ROBERT LEE PARK.